(12) United States Patent
Shin et al.

(10) Patent No.: US 11,276,399 B2
(45) Date of Patent: Mar. 15, 2022

(54) GUIDE ROBOT AND METHOD FOR OPERATING THE SAME

(71) Applicant: LG ELECTRONICS INC., Seoul (KR)

(72) Inventors: Wonho Shin, Seoul (KR); Jichan Maeng, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 16/490,468

(22) PCT Filed: Apr. 11, 2019

(86) PCT No.: PCT/KR2019/004336
§ 371 (c)(1),
(2) Date: Aug. 30, 2019

(87) PCT Pub. No.: WO2019/160396
PCT Pub. Date: Aug. 22, 2019

(65) Prior Publication Data
US 2020/0005787 A1   Jan. 2, 2020

(51) Int. Cl.
*G10L 15/22* (2006.01)
*B25J 11/00* (2006.01)
(Continued)

(52) U.S. Cl.
CPC .......... *G10L 15/22* (2013.01); *B25J 11/0005* (2013.01); *B25J 13/003* (2013.01);
(Continued)

(58) Field of Classification Search
CPC .... G10L 15/22–2015/228; G10L 15/08; G10L 2015/088; G10L 15/30;
(Continued)

(56) References Cited

U.S. PATENT DOCUMENTS 6,308,157 B1 * 10/2001 Vanbuskirk ............. G10L 15/26
704/275
2018/0133900 A1 * 5/2018 Breazeal ................ B25J 19/026
(Continued)

FOREIGN PATENT DOCUMENTS

JP        2013257598       12/2013
KR       20090000637        1/2009
(Continued)

*Primary Examiner* — Abul K Azad
(74) *Attorney, Agent, or Firm* — Fish & Richardson P.C.

(57) ABSTRACT

The present disclosure relates to a guide robot and a method of operating the same. A guide robot according to the present disclosure includes a voice receiving unit to receive a voice, a controller to determine whether the received voice includes a preset wake-up word, and a wireless communication unit to perform communication with an artificial intelligence (AI) server set to be activated by the preset wake-up word. At this time, the control unit transmits the received voice to the artificial intelligence server, receives result information from the artificial intelligence server, and outputs the received result information, when the received voice includes the preset wake-up word. And, the control unit outputs a response voice selected according to a predetermined reference when the received voice does not include the preset wake-up word. The guide robot may be operated by artificial intelligence.

19 Claims, 10 Drawing Sheets

(51) Int. Cl.
*B25J 13/00* (2006.01)
*G06K 9/00* (2022.01)
*G10L 15/08* (2006.01)

(52) U.S. Cl.
CPC ..... *G06K 9/00228* (2013.01); *G06K 9/00268* (2013.01); *G10L 15/08* (2013.01); *G10L 2015/088* (2013.01); *G10L 2015/223* (2013.01)

(58) Field of Classification Search
CPC . B25J 11/0005; B25J 13/003; G06K 9/00228; G06K 9/00268
See application file for complete search history.

(56) References Cited

U.S. PATENT DOCUMENTS

| | | | |
|---|---|---|---|
| 2018/0158458 A1* | 6/2018 | Weber | G10L 15/30 |
| 2018/0333862 A1* | 11/2018 | Hayashi | B25J 13/08 |
| 2019/0251963 A1* | 8/2019 | Li | G10L 15/22 |
| 2020/0005772 A1* | 1/2020 | Dai | G10L 13/027 |
| 2020/0047348 A1* | 2/2020 | Park | B25J 11/0015 |
| 2020/0329308 A1* | 10/2020 | Tateishi | H04R 1/028 |

FOREIGN PATENT DOCUMENTS

| | | |
|---|---|---|
| KR | 20110004015 | 1/2011 |
| KR | 20160110085 | 9/2016 |
| KR | 20180127102 | 11/2018 |

\* cited by examiner

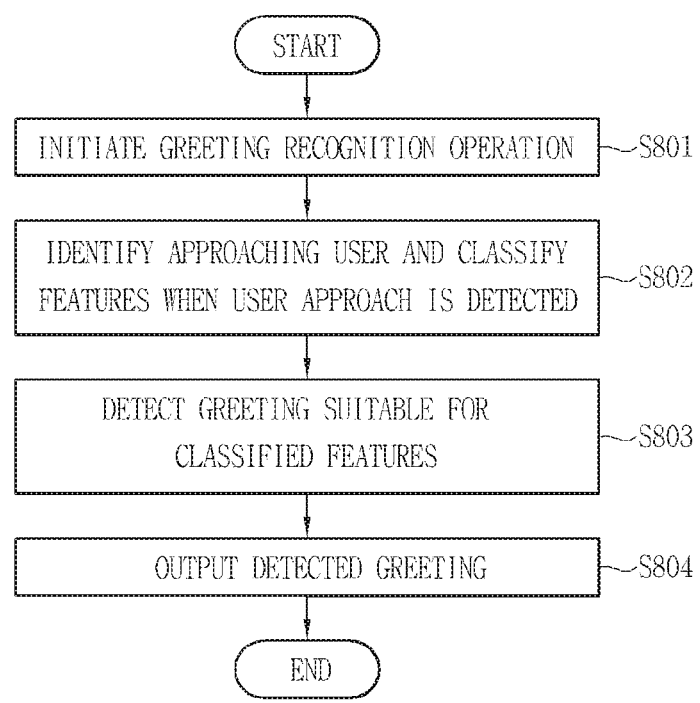

GUIDE ROBOT AND METHOD FOR OPERATING THE SAME

CROSS-REFERENCE TO RELATED APPLICATIONS

This application is the National Stage filing under 35 U.S.C. 371 of International Application No. PCT/KR2019/004336 filed on Apr. 11, 2019, which is hereby expressly incorporated by reference into the present application.

FIELD

The present disclosure relates to a guide robot capable of performing communication with an artificial intelligence (AI) server.

BACKGROUND

Along with the recent development of hardware, artificial intelligence (AI) technologies which realize human thought processes, that is, cognition, reasoning, learning, etc., by use of computing technologies are being dramatically developed.

An artificial intelligence technology itself is a subject to be researched, and also is combined indirectly with other fields of a computer science to provide various functions. Particularly, there are many active attempts to introduce artificial intelligence elements in various fields of information technologies to solve problems in the fields.

Artificial intelligence technologies are classified into strong artificial intelligence and weak artificial intelligence. Strong artificial intelligence is a technology that can make human-like thinking and decision, and is a technology that performs self-learning and self-judgment. Weak artificial intelligence is a technology that provides optimal solutions by performing cognitive processes such as perception, reasoning, etc. through a computation model.

As a part of such technology development, attempts and studies for applying artificial intelligence technologies to guide robots providing various guidance services to users are increasing.

In order to give a command to the guide robot or to talk with the guide robot, it is necessary to first call a wake-up word and recognize it. In this regard, a patent document WO 2017/217978 A1 discloses a configuration of activating a voice application through at least one wake-up word, determining whether a voice uttered by a speaker contains the wake-up word, and displaying information related to automated speech recognition.

However, for children who think that the guide robot is a human, they prefer conversations like chatting, including simple greetings. In addition, there is a problem that the elderly and the handicapped, who feel difficult to perform the call of the wake-up word naturally, are difficult to interface with the robot by saying the wake-up word. If usually used greetings are set as a wake-up word, a false recognition rate may increase, and the performance and usability of the guide robot may be drastically lowered.

In some cases, users may want to simply say hello to the guide robot rather than to obtain specific information. In this case, the users may expect the guide robot to reply to them more friendly.

DISCLOSURE

Technical Problem

In order to solve the problems described above, an aspect of the present disclosure is to provide a guide robot, which is implemented to improve usability while giving a user more friendly feeling, and a method of operating the same.

Another aspect of the present disclosure is to provide a guide robot that continuously performs customized responses suitable for various features and used words of a user even when the user does not inquire with a specific purpose, and a method of operating the same.

Still another aspect of the present disclosure is to provide a guide robot, capable of performing a response by distinguishing whether a user simply wants to say a greeting or whether the user wants to receive more specific information, and a method of operating the same.

Technical Solution

To achieve those aspects and other advantages of the present disclosure, there is provided with a guide robot, including a voice receiving unit configured to receive a voice, a control unit configured to determine whether the received voice includes a preset wake-up word, and a wireless communication unit configured to perform communication with an artificial intelligence (AI) server set to be activated by the preset wake-up word. The control unit transmits the received voice to the artificial intelligence server, receives result information from the artificial intelligence server, and output the received result information, when the received voice includes the preset wake-up word. And, the control unit outputs an answer voice selected according to a predetermined reference when the received voice does not include the preset wake-up word.

In one embodiment, the control unit may perform a greeting recognition operation when the received voice does not include the preset wake-up word, and determine whether the received voice is recognized as a greeting based on a sensing signal received from at least one sensor in the greeting recognition operation.

In one embodiment, the control unit may further determine whether or not at least one request is included in a recognized greeting when the greeting is recognized according to the greeting recognition operation, and select a response voice based on a result of the determination.

In one embodiment, the control unit may output a guide voice according to the at least one request recognized, when it is determined that the at least one request is included in the recognized greeting, and output an answer voice matched to the recognized greeting when it is determined that the at least one request is not included in the recognized greeting.

In one embodiment, the control unit may perform a false recognition operation and greeting learning based on the received voice when a greeting is not recognized in the greeting recognition operation.

In one embodiment, the answer voice selected in accordance with the preset reference may be any one of a greeting voice matched to the received voice and a guide voice for guiding utterance of the preset wake-up word.

In one embodiment, the control unit may initiate a greeting recognition operation and outputs a response voice matched to the received voice according to the greeting recognition operation, when the preset wake-up word is not included in the received voice, and output a guide voice for guiding utterance of the preset wake-up word, in response to satisfaction of a predetermined condition after the response voice is output.

In one embodiment, the predetermined condition may include at least one of when a volume of the received voice is increased, when the number of times of inputting a voice within a predetermined period of time is more than a predetermined number of times, and when a new voice is received within a predetermined period of time after the response voice is output.

In one embodiment, the control unit may output the response voice matched to a new voice when the new voice is received within a predetermined period of time without satisfying the predetermined condition after the response voice is output, and terminate the greeting recognition operation when a predetermined period of time elapses without satisfying the predetermined condition after the response voice is output.

In one embodiment, the guide robot may further include a sensor configured to detect a user approaching to a main body of the guide robot, and the control unit may initiate a greeting recognition operation when the preset wake-up word is not included in the received voice, classify user features by identifying the approaching user when the approaching user is detected by the sensor, and output the response voice by processing a greeting to be suitable for the classified user features.

In one embodiment, the control unit may acquire a facial image of the approaching user by activating a camera when the approaching user is detected by the sensor, and extract and classify the user features by analyzing the acquired facial image.

In one embodiment, the control unit may determine whether a predetermined keyword is included in the received voice when the preset wake-up word is not included in the received voice, and transmit the voice including the keyword to a speech recognition server so as to receive situation information corresponding to the keyword, and output a response voice generated based on the received situation information, when it is determined that the predetermined keyword is included in the received voice.

Also, to achieve those aspects and other advantages according to embodiments of the present disclosure, there is provided a method for operating a guide robot capable of outputting a voice, the method including: receiving a voice of a user; determining whether the received voice includes a preset wake-up word; transmitting the received voice to an artificial intelligence (AI) server, set to be activated by the preset wake-up word, receiving result information from the artificial intelligence server, and outputting the received result information, when the received voice includes the preset wake-up word; and outputting a response voice selected according to a preset reference when the received voice does not include the preset wake-up word.

In one embodiment, the outputting the answer voice selected according to the preset reference may include performing a greeting recognition operation when the received voice does not include the preset wake-up word, determining whether or not the received voice is recognized as a greeting based on a sensing signal received from at least one sensor, in the greeting recognition operation, and further determining whether or not a recognized greeting includes at least one request when the greeting is recognized according to the greeting recognition operation, and select a response voice based on a result of the determination.

In one embodiment, the method may further include outputting a guide voice according to the at least one request included, when the at least one request is included in the recognized greeting according to a result of the determination as to whether the at least one request is included, and outputting a response voice matched to the recognized greeting when the at least one request is not included in the recognized greeting according to the result of the determination as to whether the at least one request is included.

Advantageous Effects

As described above, a guide robot according to embodiments of the present disclosure can guide the user to naturally interface with the robot while making the user feel more friendly, thereby further improving usability.

Also, it is possible to determine whether or not a user has actually spoken by way of collecting various situations, considering a low recognition rate of everyday words, which may allow the user to continue natural conversations suitable for such situations.

Furthermore, even if the user does not query with a specific purpose, features of the user who is estimated to have spoken can be recognized and accordingly, a customized response can be provided and new everyday words can be continuously learned. In addition, even if the user does not speak a wake-up word, it is possible to distinguish whether the user simply says words of greeting without purpose or wants to get specific information, which may result in performing an appropriate response. Accordingly, extended daily conversations are enabled, and thus the user can feel highly friendly and become more emotional.

BRIEF DESCRIPTION OF THE DRAWINGS

FIGS. 8, 9A and 9B are views illustrating an operation of outputting a greeting voice suitable for the features of an approaching user in a guide robot in accordance with the present disclosure.

MODES FOR CARRYING OUT PREFERRED EMBODIMENTS

Figure 1:
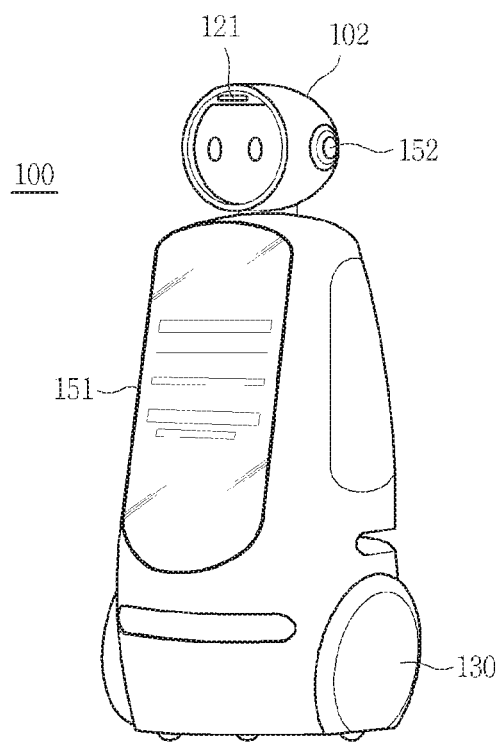
FIG. 1 is a view illustrating an embodiment of a guide robot in accordance with the present disclosure.

Hereinafter, embodiments of the present disclosure will be described in detail with reference to the accompanying drawings, and the same reference numerals are used to designate the same/like components and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present invention, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, "guide robot" disclosed herein refers to a robot that can provide a variety of information, such as road guidance, product information, airport information and the like, to a user who is using the guide robot in a place, such as an airport, a department store, etc.

Also, "guide robot" disclosed herein may refer to a robot capable of performing autonomous travel in order to guide a user to a road, a specific place, and the like.

In addition, "guide robot" disclosed herein can perform interaction and movement through continuous conversations, as well as using screen, voice, and LED, in order to provide various information and guidance to a user.

Hereinafter, FIG. 1 is a view illustrating an embodiment of a guide robot in accordance with the present disclosure. Referring to FIG. 1, a guide robot 100 according to the present disclosure may include a head (or head part) 102, a camera 121, a speaker 152, a voice recognition unit (not shown), a display unit 151, and a traveling unit 130. However, in some cases, the guide robot 100 according to the present disclosure may be implemented by excluding some of those components described herein or further including other components.

Appearance of the guide robot 100 according to the present disclosure may be defined by an upper module including the head 102 and the display unit 151 and a lower module including the travel unit 130.

At this time, the upper module and the lower module may be detachable from each other. The upper module provides a user interface that can be changed according to a service environment. The lower module provides a traveling function for moving a main body of the guide robot.

The upper module may be divided into a body part having the display unit 151 and the head part 102 having the camera 121 and the like. However, in some cases, a camera may be provided on the body part or a display unit may be disposed on the head part 102.

The camera 121 may be provided on one side of a case of the head part 102 or on one side of a case of the body part. In addition, the camera 121 may be provided in plurality. In this case, one may be provided on a front surface of the main body so as to face the front, and another may be provided on a side surface or a rear surface so as to face the side/rear. Accordingly, an angle of view covering 360 degrees can be formed.

When the camera 121 is provided in plurality, a first camera may include, for example, a 3D stereo camera. The 3D stereo camera may perform obstacle detection, user face recognition, stereoscopic image acquisition, and the like. The guide robot 100 may detect and avoid an obstacle existing in its moving direction and perform various control operations by recognizing a user, by using the first camera. In addition, the second camera may include, for example, a Simultaneous Localization And Mapping (SLAM) camera. The SLAM camera performs a function of tracking the current location of the camera through feature point matching and creates a 3D map based on the tracking result. The guide robot 100 may recognize its current position using the second camera.

The speaker 152 performs a function of notifying information to be provided to the user through a voice. Specifically, a response or search result corresponding to a user's voice, which is received through a microphone (not shown) and the speech recognition unit (not shown) provided in the guide robot 100, is output as a voice through the speaker 152. Such a speaker may be provided on the head part 102 or an outer circumferential surface of the body part provided with the display unit 151.

The display unit 151 may be located longitudinally in one direction of the body part and may display a screen for providing visual information, for example, guidance information. The display unit 151 may include a display module, a touch sensor, and a pressure sensor.

In addition, the display unit 151 may be coupled with, for example, a movement guide element, so as to open and close an inside of the body part. The display unit 151 may be fixed to the body part using a fixing member, for example.

In addition, although not shown in detail, the display unit 151 may be provided on the rear with respect to the head 102 or provided on the rear as well as the front, considering that the guide robot 100 is linearly moving along a preset path for guiding the user. Alternatively, the head 102 may be rotated by 180 degrees before the guide robot 100 linearly moves along a preset path, so as to change the appearance as if the display unit 151 is located on the rear.

In this case, the display unit 151 performs a function of outputting visual information (e.g., route (path) guidance information, query information) related to a currently-provided service. The user can see the display unit 151 installed on the rear of the guide robot 100 while following the guide robot 100.

The traveling unit 130 performs a function of moving and rotating the main body of the guide robot 100. To this end, the traveling unit 130 may include a plurality of wheels and driving motors. The operation of the traveling unit 130 is controlled according to a control command received by a control unit, and a notification may be provided through an output element such as an LED before and after the traveling unit 130 is operated.

Figure 2:
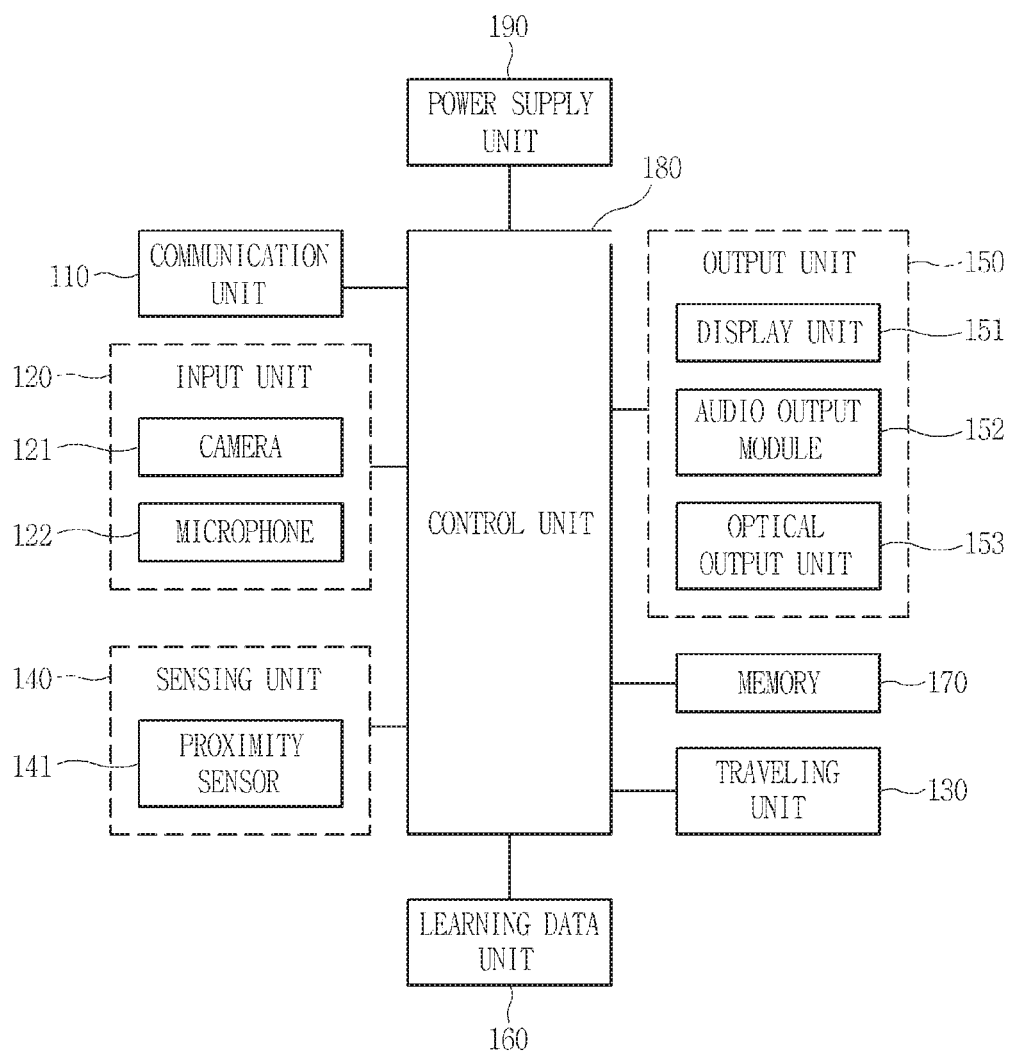
FIG. 2 is a block diagram illustrating an exemplary configuration of a guide robot in accordance with the present disclosure.

FIG. 2 is a block diagram illustrating an exemplary configuration of a guide robot in accordance with the present disclosure.

A guide robot 100 according to the present disclosure may include a communication unit 110, an input unit 120, a traveling unit 130, a sensing unit 140, an output unit 150, a learning data unit 160, a memory 170, a control unit 180, and a power supply unit 190, and the like. Those components illustrated in FIG. 2 are not essential for implementing the guide robot, and the guide robot described in this specification may be provided with more or less components than the components listed above.

The communication unit 110 may include at least one module for enabling wireless communication between the guide robot 100 and an external server, for example, an artificial intelligence (AI) server or an external terminal. In addition, the communication unit 110 may include at least one module through which the guide robot 100 is connected to at least one network.

The communication unit 110 may perform communications with an artificial intelligence (AI) server and the like by using wireless Internet communication technologies, such as Wireless LAN (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like.

The communication unit 110 may also perform communications with an external terminal and the like by using short-range communication technologies, such as Bluetooth™, Radio Frequency Identification (RFID), Infrared Data Association (IrDA), Ultra-Wideband (UWB), ZigBee, Near Field Communication (NFC), and the like.

The input unit 120 may include a camera 121 or an image input module for inputting a video signal, a microphone 122 for inputting an audio signal, a user input unit (not shown, for example, a touch key, a mechanical key, etc.), and the like. The signal data, voice data, and image data collected by the input unit 120 may be analyzed and processed as a user's control command.

The traveling unit 130 performs a function of moving and rotating the main body of the guide robot 100. To this end, the traveling unit 130 may include a plurality of wheels and driving motors. The operation of the traveling unit 130 is controlled according to a control command received by a control unit, and a notification may be provided through an output element such as an LED before and after the traveling unit 130 is operated.

The sensing unit 140 may include at least one sensor for sensing at least one of internal information related to the guide robot, surrounding environment information of the guide robot, and user information. For example, the sensing unit 140 may include a proximity sensor 141, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), and the like. Meanwhile, the guide robot disclosed herein may combine and use information sensed by at least two of those sensors.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. Further, the proximity sensor 141 may recognize position information regarding a target to be detected by using the ultrasonic waves of an ultrasonic sensor.

The output unit 150 may include at least one of a display unit 151, an audio output module 152, and an optical output unit 153 to generate an output related to visual information, auditory information, tactile information, or the like. The display unit 151 may be interlayered or integrally formed with the touch sensor so as to realize a touch screen. The touch screen may function as a user input unit for providing an input interface between the guide robot 100 and the user and simultaneously provide an output interface between the guide robot 100 and the user.

The optical output unit 153 outputs a signal for notifying the occurrence of an event of the guide robot 100 using light emitted from a light source. For example, when a movement command is transmitted to the traveling unit 130 of the guide robot 100, a signal for notifying the movement is output through the optical output unit 153.

The learning data unit 160 may be configured to receive, classify, store, and output information to be used for data mining, data analysis, intelligent decision, and machine learning algorithms and technologies. The learning data unit 160 may include at least one memory unit configured to store information, which is received, detected, sensed, generated, or predefined through the guide robot or information output through the guide robot in different manners, or to store data which is received, detected, sensed, generated, predefined or output through other components, devices and terminals.

The learning data unit 160 may be integrally provided in the guide robot or may include a memory. In one embodiment, the learning data unit 160 may be implemented by the memory 170. However, the present disclosure is not limited to this. Alternatively, the learning data unit 160 may be implemented in an external memory associated with the guide robot 100, or may be implemented by a memory included in a server that can communicate with the guide robot 100. In another embodiment, the learning data unit 160 may be implemented by a memory which is maintained in a cloud computing environment, or by another remote controllable memory which is accessible by the guide robot through a communication method such as network communication.

The learning data unit 160 is generally configured to store data, which is to be used in supervised or unsupervised learning, data mining, predictive analysis or other machine learning technologies, in at least one database so as to identify, index, classify, manipulate, store, search for and output the data. Information stored in the learning data unit 160 may be used by the control unit 180, which uses at least one of different types of data analysis, machine learning algorithms, and machine learning technologies, or by a plurality of controllers (processors) included in the guide robot. Examples of such algorithms and technologies may include K-nearest neighbor systems, fuzzy logic (for example, possibility theory), neural networks, Boltzmann machines, vector quantization, pulsed neural nets, support vector machines, maximum margin classifiers, hill-climbing, inductive logic systems, Baysian networks, Petri nets (e.g., finite state machines, Mealy machines, Moore finite state machines, etc.), classifier trees (e.g., perceptron trees, support vector trees, Markov trees, decision tree forests, random forests, etc.), pandemonium models and systems, clustering, artificially intelligent planning, artificially intelligent forecasting, data fusion, sensor fusion, image fusion, reinforcement learning, augmented reality, pattern recognition, automated planning, and the like.

The control unit 180 may determine or predict executable operations of the guide robot based on information decided or generated using data analysis, machine learning algorithms, and machine learning technologies. For this, the control unit 180 may request, search, receive, or utilize data of the learning data unit 160. The control unit 180 may perform various functions for implementing a knowledge-based system, an inference system, a knowledge acquisition system, and the like, and may perform various functions including a system (e.g., a fuzzy logic system) for fuzzy inference, an artificial neural system, and the like.

The control unit 180 may also include sub modules, such as an I/O processing module, an environmental condition module, a speech-to-text (STT) processing module, a natural language processing module, a task flow processing module, a service processing module, and the like, which enable voice and natural language processing. Each of the sub modules may have access authority for at least one system or data and model, or its subset or superset. Here, subjects for which each of the sub modules has the access authority may include scheduling, a vocabulary index, user data, a task flow model, a service model, and an automatic speech recognition (ASR) system. In another embodiment, the control unit 180 or the guide robot may be implemented as the sub module, system, or data and model.

In some embodiments, on the basis of the data in the learning data unit 160, the control unit 180 may also be configured to detect and sense user's requirements, based on contextual conditions or user's intent represented by a user input or a natural language input.

When the operation of the guide robot is decided based on the data analysis, the machine learning algorithm, and the machine learning technology, the learning data unit 160 may control components of the guide robot to execute the decided operation. The control unit 180 may execute the decided operation by controlling the guide robot on the basis of a control command.

The memory 170 stores data supporting various functions of the guide robot 100. The memory 170 may store a plurality of application programs (or applications) driven in the guide robot 100, data for operations of the guide robot 100, and command words.

The memory 170, for example, may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like.

The control unit 180 typically controls the overall operation of the guide robot 100, in addition to the operations related to the application programs. The control unit 180 may provide to the user or process appropriate information or functions by processing signals, data, information, etc. input or output through the above-mentioned components, by activating application programs stored in the memory 170, or by controlling the traveling unit 130.

Under the control of the control unit 180, the power supply unit 190 receives external power or internal power and supplies such power to the respective components included in the guide robot 100. The power source unit 190 may include a battery, which may be an internal battery or a replaceable battery.

At least some of the respective components may cooperatively operate to implement operations, controls or control methods of the guide robot in accordance with various embodiments described below. In addition, the operations, controls, or control methods of the guide robot may be implemented on the guide robot by running at least one application program stored in the memory 170.

On the other hand, various embodiments described below may be embodied in a recording medium readable by a computer or similar devices using, for example, software, hardware, or a combination thereof.

Figure 3:
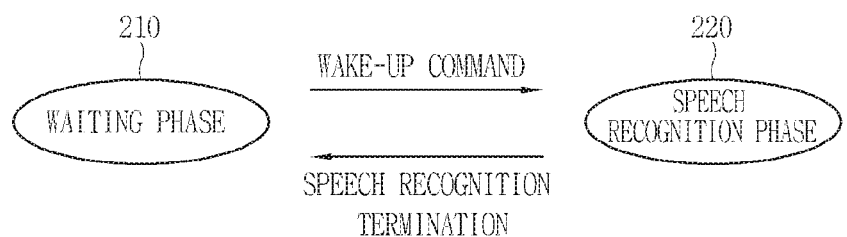
FIG. 3 is a view illustrating a speech recognition process of a guide robot in accordance with the present disclosure.

FIG. 3 is a view illustrating a speech recognition process of a guide robot in accordance with the present disclosure. Referring to FIG. 3, the guide robot according to the present disclosure may be set to a waiting phase 210 or a speech recognition phase 220.

The waiting phase 210 is a state for detecting whether or not a word (words) related to an execution of a speech recognition function is spoken near the guide robot before executing the speech recognition function. To this end, in the waiting phase 210, the control unit 180 of the guide robot may monitor whether a sound over a specific loudness is continuously detected through the microphone 122.

Since a speech analysis is not performed in the waiting phase 210, low power, for example, currents of about 4.4 mA may be merely consumed. This waiting phase 210 may be termed "listening phase".

The control unit 180 of the guide robot may switch from the waiting phase 210 to the speech recognition phase 220 when the sound of the specific loudness or more is detected in the waiting phase 210.

The speech recognition phase 220 is a state in which the control unit 180 analyzes a speech (voice) input through the microphone. Since the speech analysis is performed in the speech recognition phase 220, more currents are consumed than in waiting phase 210. For example, before a preset wake-up word is received, the guide robot is in the waiting phase 210 in which the speech analysis is not performed, and thus the consumed currents can be reduced.

The control unit 180 may determine whether or not a preset wake-up word for starting the speech recognition has been received in the speech recognition state 220, before the speech analysis.

The wake-up word is a control command for starting the speech analysis, and may be set to various words for each device. For example, the wake-up word may be set to "Hello, my phone", "Alexa", "OK, Google", "Air star", or the like. The control unit 180 may start an accurate speech analysis on the speech uttered after the preset wake-up word is received.

The control unit 180 may analyze voice information using the speech recognition algorithm in the speech recognition state 220. The control unit 180 may control the guide robot according to a voice command corresponding to the voice information based on the analysis result. Such speech analysis may be performed using a separate third party application installed in the guide robot.

The control unit 180 may transmit speech analysis information to a preset artificial intelligence (AI) server to process such information through an AI algorithm.

The AI server is a server that provides a function of learning a large amount of information using an AI algorithm and deriving optimal result information based on the learned information. The AI server is a server performing communication with the guide robot, and may include a learning data unit 160 that stores learned data. In this case, the learning data unit 160 illustrated in FIG. 2 may perform only a function of learning everyday words to be described later.

Alternatively, the control unit 180 may generate result information in response to input voice (or speech) information, based on data stored in the learning data unit 160. The following description will be given under the assumption that the guide robot 100 is set to receive the result information through communication with the AI server.

The control unit 180 may switch the speech recognition phase 220 back to the waiting phase 210 when the preset wake-up word is not received or a preset speech (or voice) is not received for a preset period of time in the speed recognition phase 220. The operation phases of the guide robot related to the speech recognition function have been described above.

Hereinafter, description will be given in detail of an operation procedure for making a user feel friendly and for naturally interfacing the user with the guide robot based on the speech recognition function.

The present disclosure has implemented an operation procedure of interfacing the user and the guide robot with each other so that the user can get a desired guidance by naturally speaking a wake-up word. In addition, the present disclosure has implemented an operation procedure of recognizing a case where the user simply wants to give a greeting and naturally reply to the case.

Figure 4:
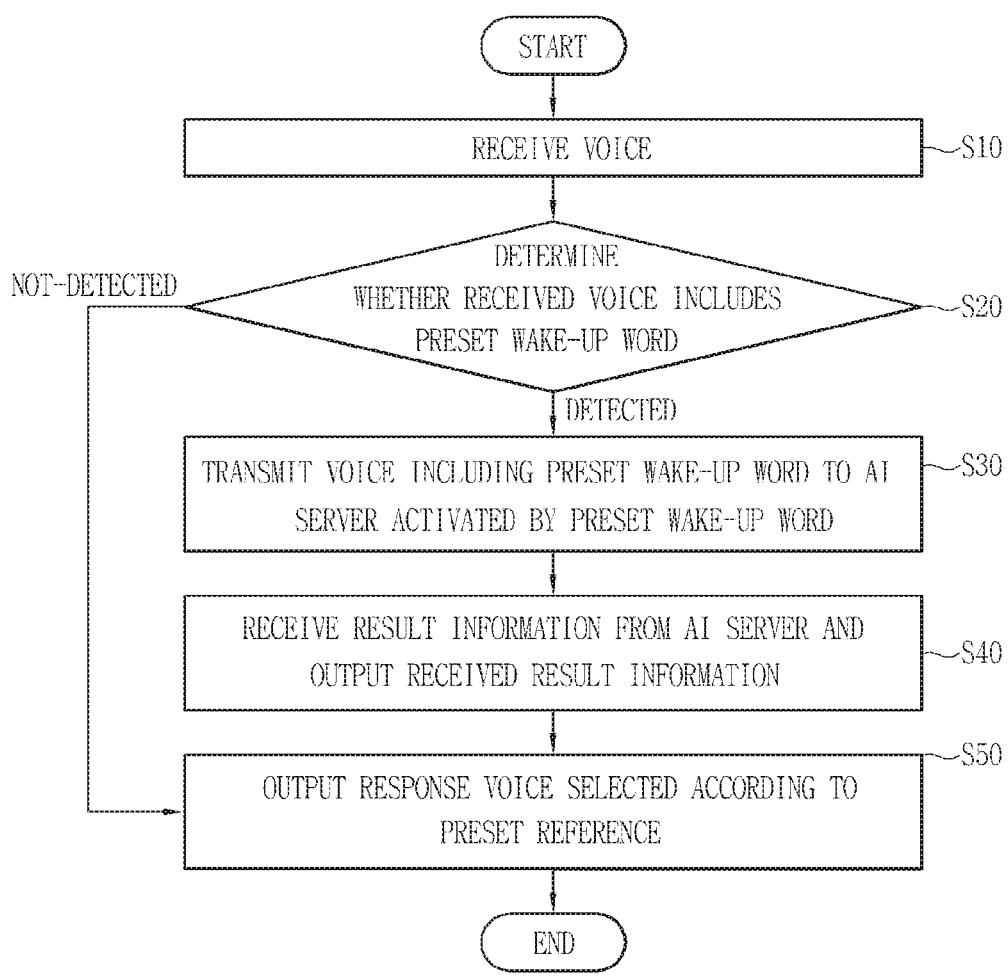
FIG. 4 is a flowchart illustrating a method of operating a guide robot in accordance with the present disclosure.

Hereinafter, FIG. 4 is a flowchart illustrating a method of operating a guide robot in accordance with the present disclosure. Referring to FIG. 4, first, a voice (or speech) is received from outside (S10).

Here, the voice (or speech) received from the outside means a user speech having a volume which is loud enough to switch the waiting phase 210 to the speech recognition phase 220 described with reference to FIG. 3. Also, the user speech may be converted into text through a Speech-to-text (STT) function so as to be output to the display unit 151 of the guide robot.

When the voice is received as described above, the control unit 180 of the guide robot 100 determines whether the received voice includes a preset wake-up word (S20). Here, the preset wake-up word is a keyword which has been set to activate an AI server cooperatively working with the guide robot 100 or the learning data unit 160. For example, the preset wake-up word may be 'Air star', 'Ok, Google', 'Hi, Clove', or the like.

As a result of the determination, if the preset wake-up word is included, the received voice is transmitted to the AI server activated by the preset wake-up word to process a command included in the received voice (S30). At this time, the received voice may include only the preset wake-up word, or may include a command as well as the preset wake-up word.

In the former case, the control unit 180 of the guide robot 100 maintains a waiting phase for receiving a subsequent speech in the activated state of the AI server. In the latter case, the control unit of the guide robot searches for a result corresponding to an analysis result of the command after the activation of the AI server.

Thereafter, the guide robot receives result information from the AI server and outputs the received result information (S40). At this time, the received result information may be displayed on the display unit 151 of the guide robot or output through the speaker 152 of the guide robot. Alternatively, the information may be simultaneously output through the display unit and the speaker, or associated different information may be output simultaneously through the speaker and the display unit.

On the other hand, when it is determined in the step S20 that the preset wake-up word is not included in the received voice, a response voice (answer voice, voice answer) selected according to a preset reference is output (S50).

To this end, the control unit 180 of the guide robot may enter a greeting recognition operation mode when the preset wake-up word is not included in the received speech. In the greeting recognition operation mode, it may be performed to determine whether the received speech is a greeting that the user has actually said, confirm the features of the user who has said the greeting, and estimate whether or not the user wants to receive specific information.

Here, the response voice selected according to the preset reference may roughly be a greeting-type speech that matches the voice received by the guide robot, or a guide-type speech that guides the user to say a preset wake-up word activating the AI server. Alternatively, the response voice may be a combination of the greeting-type speech and the guide-type speech.

The preset reference may be actively set or varied in association with an analysis result of the received voice, a sensing signal sensed while the voice is received, and a previously-output response. For example, presence or absence of a specific keyword (e.g., where, when) according to the analysis of the received voice may be set as the preset reference. In this case, if it is detected that the specific keyword is included in the received voice, the guide-type speech may be output.

On the other hand, if the received voice does not include the preset wake-up word and is not recognized as a meaning of a greeting, the control unit 180 may perform a false recognition operation related to a greeting word.

Here, the false recognition operation may be divided into two processes. A first process is a process of outputting an answer suitable for a misrecognized greeting. A second process is a process of determining whether or not to learn the misrecognized greeting as a new word. In the second process, a process of determining whether the misrecognized greeting is a new word or a meaningless word is further performed.

In addition, the response voice selected according to the preset reference is adopted as a greeting and a guide voice (speech) that can be naturally understood as a greeting and a guide voice in any situation, considering a case where the received voice is not actually said by the user.

To this end, after it is determined that the preset wake-up word is not included in the received voice, an additional operation may be performed to recognize whether the received voice has been said by the user and whether the received voice is a greeting, by way of activating an additional element (e.g., a camera, a greeting database).

In addition, the response voice selected according to the preset reference may be configured by a customized greeting and a guide word that can make the user feel more friendly with the robot. To this end, an additional operation may be performed to identify a user who has uttered the speech so as to extract features of the user, or to memorize a user who has visited again within a predetermined period of time.

Hereinafter, various methods of generating a customized response voice in a state where a speech (or voice) received by the guide robot does not include a preset wake-up word will be described in more detail.

Figure 5:
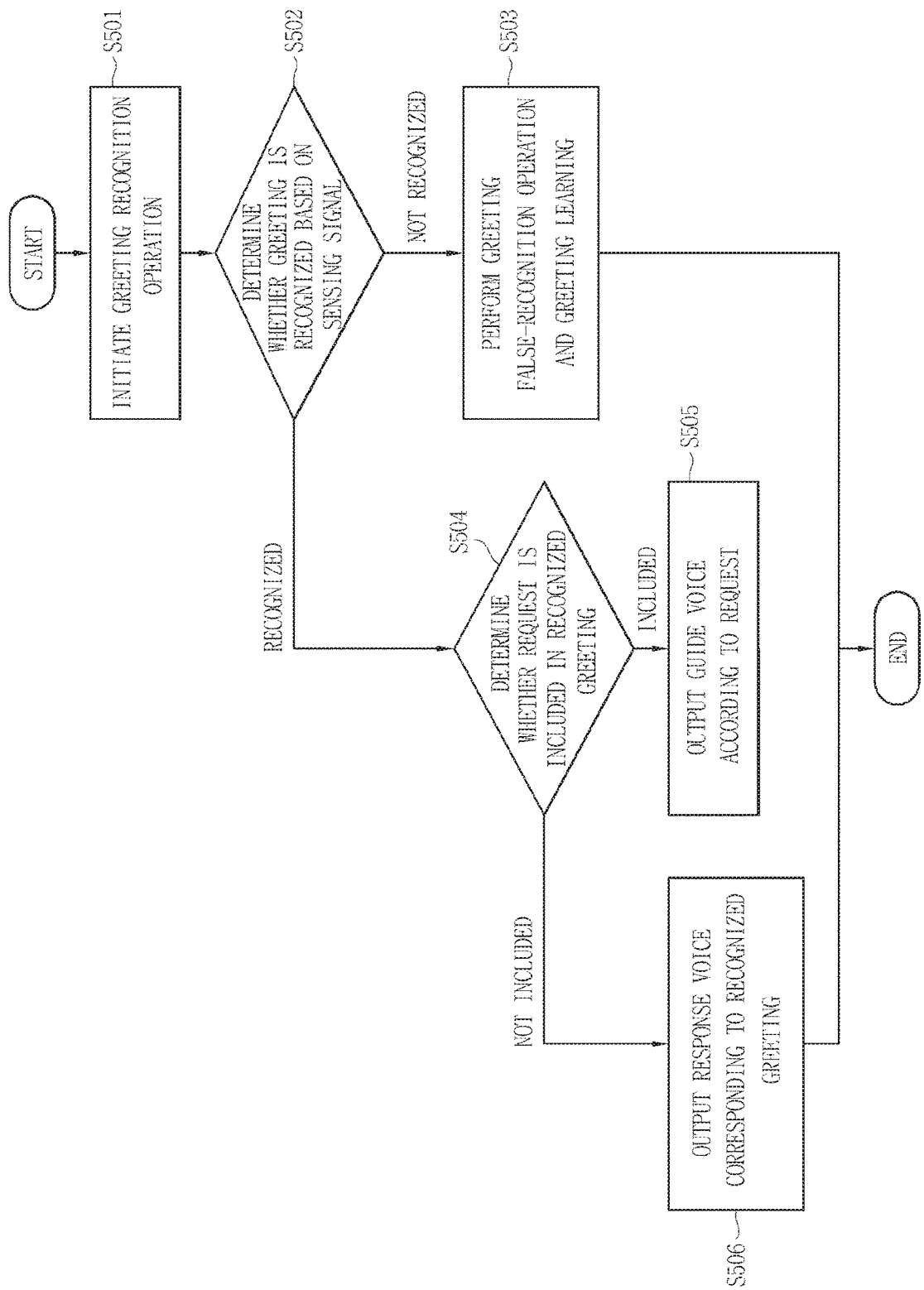
FIG. 5 is a flowchart illustrating a process of outputting a different response depending on whether or not a request is included in a greeting, in a guide robot in accordance with the present disclosure.

Hereinafter, FIG. 5 is a flowchart illustrating a process of outputting a different response voice depending on whether or not a request is included in a greeting, in a guide robot in accordance with the present disclosure.

The flowchart of FIG. 5 is carried out in a state in which a preset wake-up word is not detected in a speech (spoken voice) received by the guide robot. Here, the state in which the preset wake-up word is not detected in the received voice means that the voice received by the guide robot has a volume loud enough to switch the 'waiting phase' to the 'speech recognition phase' described in FIG. 3 and simultaneously has a meaning.

Here, the voice having the meaning may include onomatopoeias such as "Oh", "Ha-ha", etc., in addition to words, letters, and expressions indicating specific meanings.

Referring to FIG. 5, first, a greeting recognition operation is initiated in a state where a preset wake-up word is not detected in a voice (speech) received by the guide robot (S501).

When the greeting recognition operation is initiated, the control unit of the guide robot determines whether or not the greeting is recognized based on a sensing signal sensed by at least one sensor provided in the main body (S502).

The reason for determining whether or not the greeting is recognized based on the sensing signal is to determine whether the received voice corresponds to ambient noise or has been actually spoken by the user.

Here, the at least one sensor may include at least one of a proximity sensor using infrared rays or the like, a camera sensor, a motion sensor, an RGB sensor, an infrared sensor, a finger scan sensor, an environmental sensor, a voice recognition sensor, and a touch sensor.

For example, when a voice of a specific volume or more is received by the main body of the guide robot and a touch is applied to one side of the main body, the control unit 180 may recognize the received voice as a greeting based on a sensing signal generated by the touch.

In addition, for example, if a voice of a specific volume or more is received by the main body of the guide robot and the user approaches close to the main body according to a determination result through a camera sensor, the control unit 180 may recognize the received voice as a greeting based on a sensing signal generated by the approach.

When it is determined in the step S502 that the received voice is not a greeting, a greeting false-recognition operation and greeting learning may be performed (S503).

Here, the greeting false-recognition operation may include a process of processing the received voice to be recognized as a greeting. The greeting learning may include a process of performing an update by inputting a newly recognized greeting into a greeting-related database.

In addition, the control unit 180 of the guide robot according to the present disclosure cooperatively works with the learning data unit 160 to learn the newly recognized greeting as a greeting word or may perform expanded learning by searching for a response word matched to the newly recognized greeting.

On the other hand, when it is determined in the step S502 that the received voice is a greeting, the control unit of the guide robot additionally determines whether at least one request (requirement) is included in the recognized greeting (S504).

Here, the at least one request may refer to that the received voice includes query information, for example, query related keywords (e.g., here, there, what, where, place, go, go?, what?, etc.).

When it is determined that the at least one request is included in the recognized greeting, the control unit of the guide robot outputs a guide voice (speech) corresponding to the request (S505).

Specifically, if the response guide to the request can be sufficiently provided from among pieces of information stored in advance in the memory of the guide robot, an appropriate response guide can be detected and output from the memory. For example, if a greeting voice (or speech) "Hello, what's your name?" is received, the control unit 180 may determine that a request is included in the recognized greeting, and output a response voice, for example, "Hello, my name is 000", which has a combined form of a greeting response voice and a name (wake-up word).

On the other hand, if a response guide to a request cannot be sufficiently provided from among pieces of information stored in advance in the memory of the guide robot, a connection with an AI server, and thus a guide voice for guiding utterance of the preset wake-up word may be output.

Further, in one embodiment, whether a voice including a preset wake-up word is input within a predetermined time after a guide voice according to a request is output may be determined, and when the voice is not input, the guide voice may be successively output. For example, a guide voice in a combined form of request+wake-up word may be output.

On the other hand, if it is determined in the step S504 that a request is not included in the recognized greeting, an appropriate response voice which matches the recognized greeting is output (S506).

Here, the appropriate response voice which matches the recognized greeting refers to a response voice which is processed on the basis of situation information, such as today's weather, time zone, etc. in addition to the features of a spoken user detected by a sensor.

As described above, according to the present disclosure, it is determined whether or not a user' voice (speech) is recognized as a greeting even if the user does not speak a preset wake-up word, and then it is further determined whether or not an additional request is included when the voice is recognized as the greeting. Accordingly, an appropriate response corresponding to the determination results can be given, thereby further improving usability.

Figure 6:
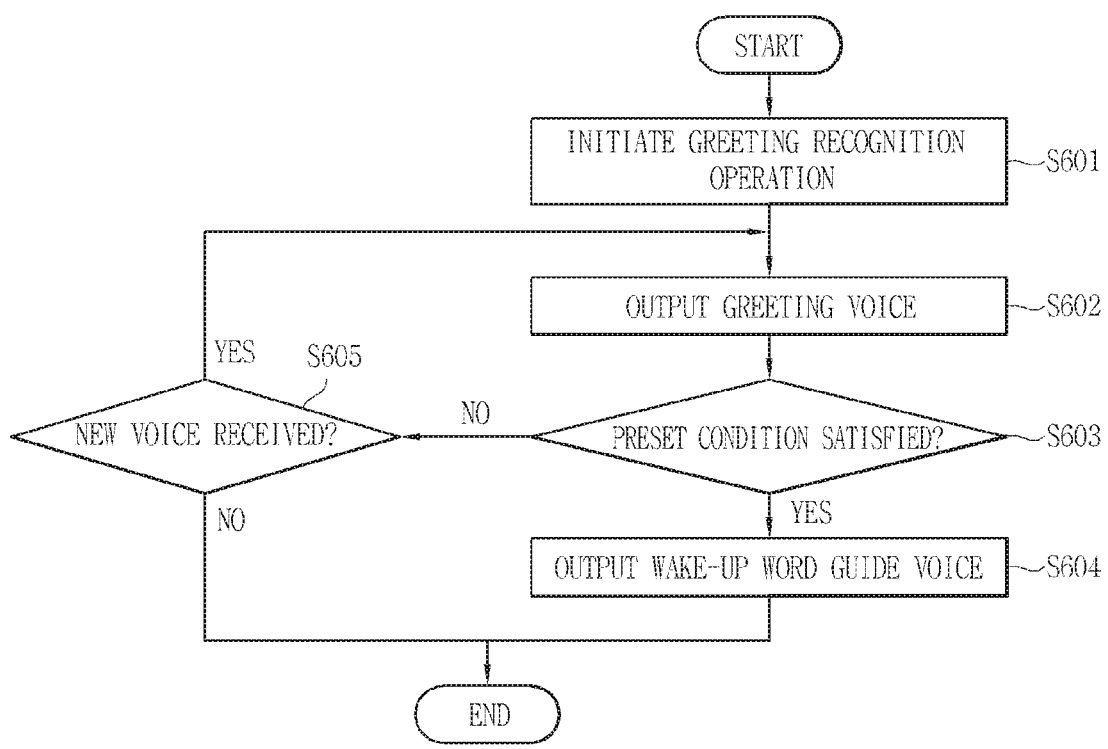
FIG. 6 is a flowchart illustrating a process of determining whether or not to output a wake-up word guide voice depending on satisfaction or non-satisfaction of a preset condition, in a guide robot in accordance with the present disclosure.

FIG. 6 is a flowchart illustrating a process of determining whether or not to output a wake-up word guide voice depending on satisfaction or non-satisfaction of a preset condition, in a guide robot in accordance with the present disclosure.

Referring to FIG. 6, first, a greeting recognition operation is initiated as a voice (or speech) is received by the guide robot (S601). Here, the greeting recognition operation may be executed when a preset wake-up word is not included in the received voice.

In addition, although not shown, an initiation condition of the greeting recognition operation may be added. For example, 'greeting recognition operation' may be initiated in the case where a voice received by the guide robot has a predetermined volume or more and does not include a preset wake-up word. Also, although not shown, even if no voice is received, the 'greeting recognition operation' may be started even when a touch is detected on a specific part of the guide robot, for example, on the display unit/head.

In addition, a termination condition corresponding to the initiation condition of the greeting recognition operation may be added. For example, the 'greeting recognition operation' may be terminated when a voice of a predetermined volume or lower is received after the initiation of the greeting recognition operation or when a user's voice/user input (touch input, specific motion)/user approach is not detected within a predetermined time after the reception of the voice.

According to the greeting recognition operation, the guide robot outputs an appropriate greeting voice (S602). Here, the appropriate greeting voice may include words, vocabulary, onomatopoeias, mimetic words, a tone, a gender, and the like, selected according to an analysis result of the received voice.

After the greeting voice is output, the control unit of the guide robot determines whether a predetermined condition is satisfied (S603).

Here, the predetermined condition may be one of when the volume of the received voice is increased, when the number of times of inputting a voice within a predetermined time is more than a predetermined number of times, when a new voice is received within a predetermined time after the response voice is spoken, and the number of times of outputting a greeting voice within a predetermined time.

For example, when a voice additionally spoken by the user is received within a predetermined time (e.g., within 3 seconds) after the greeting voice is output), it is determined that the predetermined condition is satisfied, and the process may go to step S604. On the other hand, when the additional voice is received after the predetermined time elapses, it is determined that the predetermined condition is not satisfied and then the process may go to step S605.

When the predetermined condition is satisfied, the guide robot outputs a wake-up word guide voice (S604). Here, the wake-up word guide voice refers to a guide voice for guiding utterance of the preset wake-up word.

At this time, in one embodiment, a wake-up word guide voice may be modified and output in association with which of the predetermined conditions is satisfied.

On the other hand, when the predetermined condition is not satisfied, the control unit of the guide robot determines whether a new voice has been received (S605).

In other words, by maintaining the speech recognition phase of FIG. 3 even after the lapse of the predetermined time, it is determined whether or not a new voice recognized as a greeting is received. However, at this time, in the case where a threshold time has elapsed, the control unit of the guide robot may control the speech recognition phase to be switched to the listening phase, i.e., the waiting state (see FIG. 3).

When the predetermined condition is not satisfied but a new voice is received, a greeting voice corresponding to the new voice is output (S602). That is, a response voice that matches the new voice is output.

On the other hand, although not shown, when a greeting voice is output again (S602) as the new voice is received (S605) although the predetermined condition (S603) is not satisfied after the output of the greeting voice (S602), the count of the number of times of outputting the greeting voice within the predetermined time is incremented by one. Therefore, the predetermined condition (S603) is automatically satisfied, and the wake-up word guide voice is output subsequently after the output of the greeting voice (S602).

On the other hand, when the predetermined time elapses without satisfaction of the predetermined condition (S603) after the output of the greeting voice (S602), the greeting recognition operation may be terminated.

In another example, the control unit 180 may automatically output a guide voice for guiding utterance of the wake-up word when there is no input of another voice within a predetermined time after the voice without including the preset wake-up word is received.

Alternatively, if there is no input of another voice within a predetermined of time after the voice without including the preset wake-up word is received, the control unit 180 may determine whether or not to output the guide voice after checking through sensors such as a camera whether the user who uttered the speech is still adjacent to the main body.

Figure 7A:
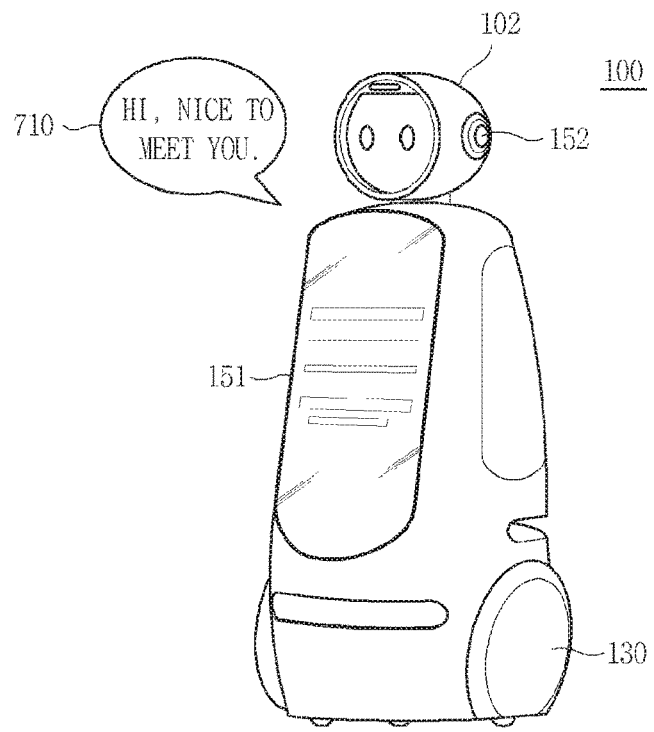
FIGS. 7A and 7B are exemplary views illustrating an operation of outputting different response voices related to FIG. 6.
Figure 7B:
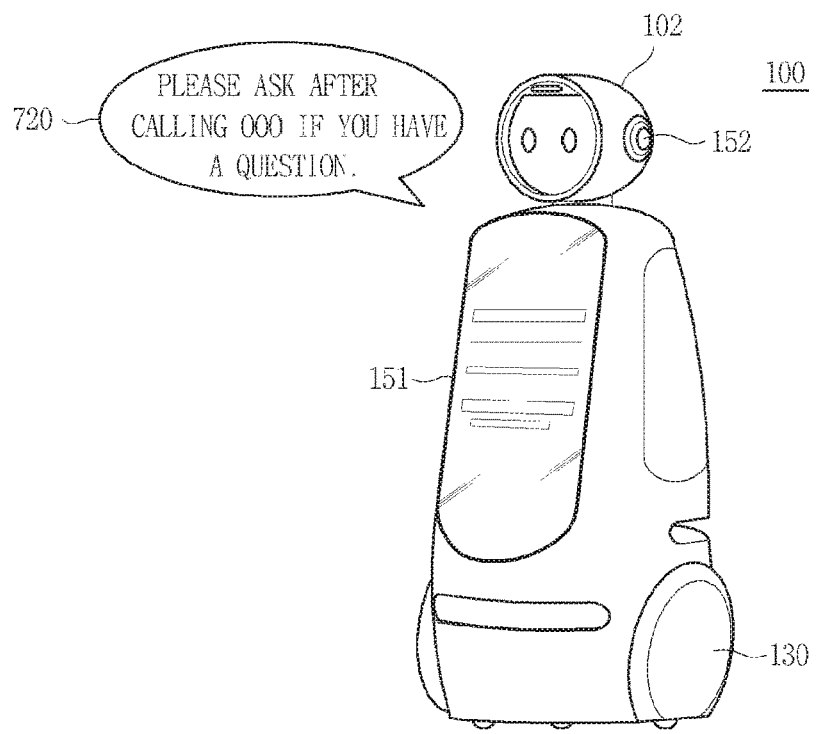

FIGS. 7A and 7B are exemplary views illustrating an operation of outputting different response voices related to FIG. 6. FIG. 7A illustrates an example of a greeting type response voice (hereinafter, referred to as 'first type of response voice') 710 corresponding to a recognized greeting, and FIG. 7B illustrates an example of a guide type response voice (hereinafter, referred to as 'second type of response voice') 720.

In one embodiment, the first type of response voice and the second type of response voice may alternately be output. For example, the first type of response voice and the second type of response voice may be output in order.

In another embodiment, only one or a combination of the first type of response voice and the second type of response voice may be output based on the number of times and intervals that the voice is received.

On the other hand, vocabulary, tone, and volume of the first type of response voice and the second type of response voice may be modified based on situation information such as current position information of the guide robot main body, current time zone information, weather information, and the like, as well as the user's features. For example, if a child speaks a greeting during a daytime zone when many people are active, the volume of voice may be increased and the response voice may be changed to a short intimate greeting vocabulary word for output.

Figure 9A:
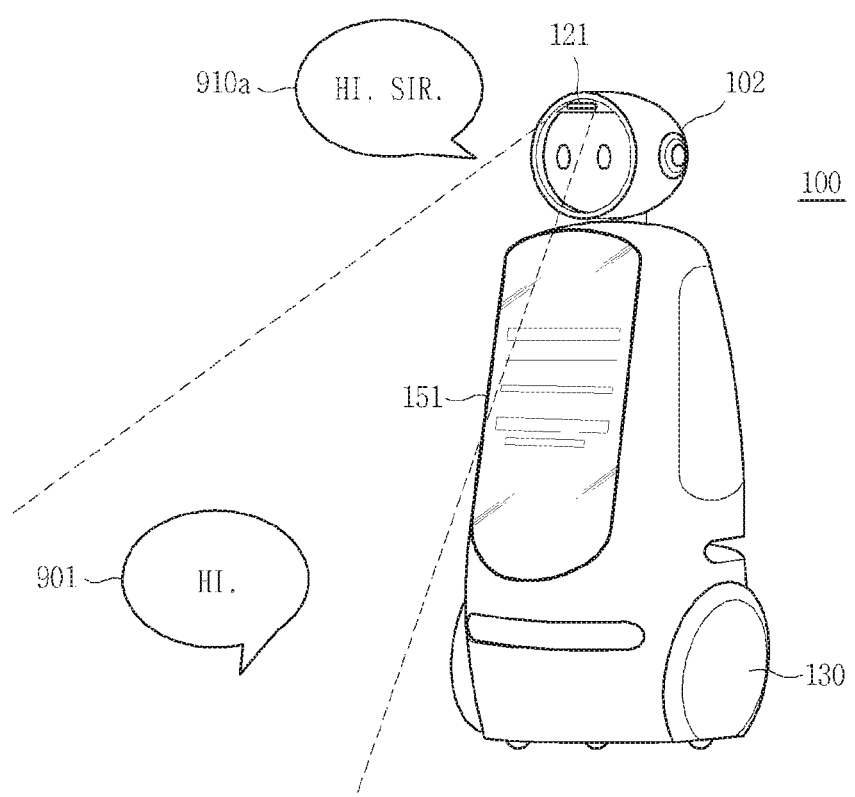
Figure 9B:
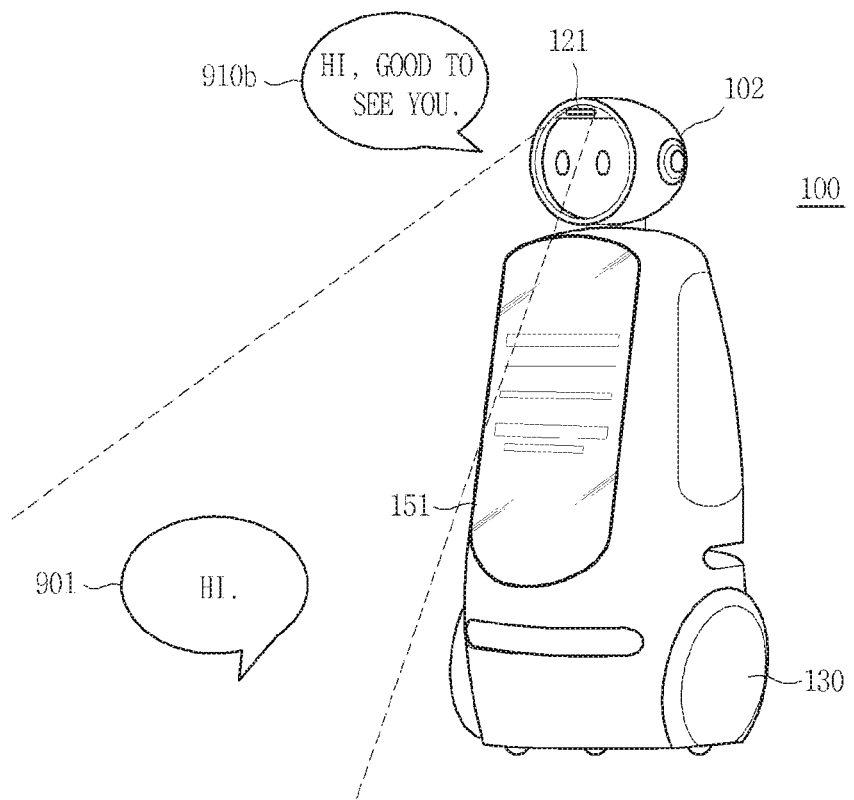

FIGS. 8, 9A and 9B are views illustrating an operation of outputting a greeting voice suitable for the features of an approaching user in a guide robot in accordance with the present disclosure.

Referring to FIG. 8, first, a greeting recognition operation is initiated as a voice (or speech) without including a preset wake-up word is received by the guide robot (S801). Next, the control unit of the guide robot detects whether the user approaches the main body of the guide robot, and when the user's approach is detected, confirms the approaching user to perform an operation of classifying features (S802).

Specifically, in order to detect the user's approach, at least one sensor of the sensing unit 140 of the guide robot 140 may be activated to detect the user's approach, namely, whether the user gradually approaches or gets away the main body, according to the lapse of time.

When the user's approach is detected, a sensor for identifying the approaching user, for example, a camera sensor, may be activated. Further, as the user's approach is detected, the head of the guide robot may be automatically rotated toward a direction in which the voice was received and/or a direction in which the user's approach was detected. Then, through the activated camera sensor, the presence of the approaching user and the operation of identifying the user's face may be performed.

When the presence of the user is identified through the camera sensor, the user including the user's face may be captured, and the captured image may be analyzed to recognize the user's features.

Such user's features may include, for example, objective items such as a gender, an age, presence or absence of a partner, and the like.

These user's features may also include an emotional state which matches a user's facial expression which is analyzed using the known algorithms. To this end, a process of detecting a face area from the captured image may be performed. Emotional states that match facial expressions of the user may be classified into 'joyful', 'angry', 'sad', 'not bad', 'tense', and the like If the emotional state of the user who has uttered the speech is estimated as described above, the same or corresponding facial expression may be output through a second display provided on the front surface of the head 102 of the guide robot. This may allow the user to feel more friendly toward the guide robot.

In this manner, when the user's features are classified, a greeting suitable for the classified features may be detected from the memory or a linked database (S803).

To this end, the guide robot according to the present disclosure may operate in cooperation with a plurality of greeting databases corresponding to various user features.

For example, it is assumed that a first database is a gender-based greeting database, and a second database is an emotion-based greeting database. According to an analysis result of the captured image of the user, if the user is classified based on features into a female in 30s who feels happy, a greeting word used mainly by women in 30s may be extracted from the first database, and a greeting word that matches joyful feeling may be extracted from the second database. Those extracted words may be combined to be processed to a greeting appropriate for the classified features.

Here, processing to a suitable greeting may include whether or not to apply honorific words, a tone of voice, a pitch, a volume, a speaking rate, whether or not to apply additional words, and the like. The thusly detected or processed greeting is output by voice (S804). In addition, the processed greeting may be output even on the display unit 151 while being output by voice.

FIGS. 9A and 9B illustrate examples in which different response voices are output according to user features when the same greeting word is received by voice. Specifically, FIG. 9A illustrates a situation where an 'old man/woman' said 'Hello', and FIG. 9B illustrates a situation where a 'child' said 'Hello'.

The guide robot activates the camera 121 provided on the head (or the body part), identifies the user who has said the greeting, and classifies the user's features.

Thus, by using words detected from different databases, an honorific greeting response (e.g., "Hello, sir") is output in FIG. 9A and a short and friendly greeting response (e.g., 'Hi, nice to see you.') is output in FIG. 9B.

Also, although not shown, after such greeting response is output, the initially-matched different databases are applied even to a guide voice which guides utterance of a preset wake-up word. For example, in the situation illustrated in FIG. 9A, a guide voice 'Sir, please say 000 if you want more information.' may be output. In the situation illustrated in FIG. 9B, a guide voice 'Say 000 if you have a question.' may be output.

As described above, a suitable answer can be given according to user features, which may allow the user to feel more friendly and emotional.

Figure 10:
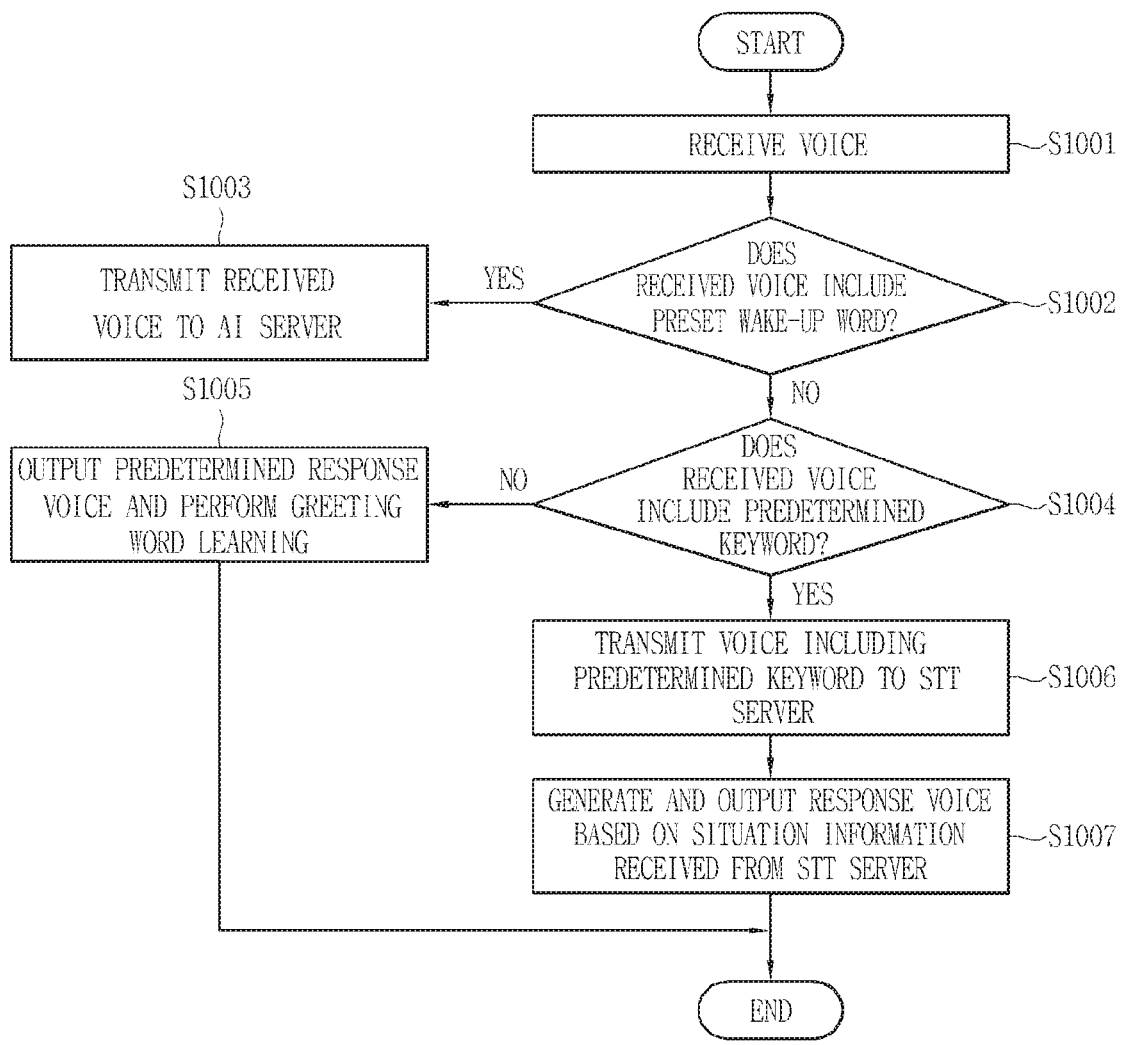
FIG. 10 is a flowchart illustrating a processing operation in a case where a predetermined keyword other than a preset wake-up word is included in a received voice, in a guide robot in accordance with the present disclosure.

FIG. 10 is a flowchart illustrating a processing operation in a case where a predetermined keyword other than a preset wake-up word is included in a received voice, in a guide robot in accordance with the present disclosure.

Referring to FIG. 10, when the user's voice (or speech) is received in the guide robot (S1001), the control unit of the guide robot determines whether the received voice includes a preset wake-up word (S1002).

As a result of the determination, if the preset wake-up word is included, the received voice is transmitted to a linked AI server (S1003). On the other hand, if it is determined that the preset wake-up word is not included, it is further determined whether the received voice includes a predetermined keyword (S1004).

If the received voice does not include the predetermined keyword, a predetermined response voice is output and greeting word learning is performed (S1005). At this time, greeting word learning includes a process of learning the received voice as a new greeting word.

If the received voice contains the predetermined keyword, the voice including the predetermined keyword is transmitted to a speech recognition server (Speech-To-Text (STT)) (S1006).

The speech recognition server may convert the received voice (speech) into text and search for situation information corresponding to the converted text. Here, the situation information may include query guidance information that is matched to the keyword and stored. For example, when 'way/place/where' is set as a keyword, 'if you want to find a way~' may be searched as matched status information.

Next, the control unit of the guide robot generates and outputs a response voice based on the situation information received from the speech recognition server (S1007).

Specifically, the guide robot may output the processed guide voice based on the situation information received from the speech recognition server. For example, in the case where a speech 'if you want to find a way' is received as the situation information, a guide voice (e.g., 'Please ask after calling 000 if you want to find a way') which is generated by combining (merging) text corresponding to the received situation information with a predetermined wake-up word may be output.

As described above, a guide robot according to the present disclosure can guide the user to naturally interface with the robot while making the user feel more friendly, thereby further improving usability. Also, it is possible to determine whether or not the user has actually spoken by way of collecting various situations, considering a low recognition rate of everyday words, which may allow the user to continue natural conversations suitable for such situations. Furthermore, even if the user does not query with a specific purpose, features of the user who is estimated to have talked can be recognized and accordingly, a customized response can be provided and new everyday words can be continuously learned. In addition, even if the user does not speak a wake-up word, it is possible to distinguish whether the user simply says words of greeting without purpose or wants to get specific information, which may result in performing an appropriate response. Accordingly, extended daily conversations are enabled, and thus the user can feel highly friendly and become more emotional.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 180 of the terminal. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

The invention claimed is:

1. A guide robot, comprising:
a voice receiving unit configured to receive a voice;
a control unit configured to determine whether the received voice includes a preset wake-up word; and
a wireless communication unit configured to perform communication with an artificial intelligence (AI) server set to be activated by the preset wake-up word,
wherein the control unit is configured to:
based on the received voice including the preset wake-up word, transmit the received voice to the artificial intelligence server, receive result information from the artificial intelligence server, and output the received result information, and
based on the received voice not including the preset wake-up word, determine whether or not at least one request is included in the received voice, and
output a response voice matched to the received voice based on a result of a determination of whether or not at least one request is included in the received voice.

2. The guide robot of claim 1, wherein the control unit performs a greeting recognition operation when the received voice does not include the preset wake-up word, and determines whether the received voice is recognized as a greeting based on a sensing signal received from at least one sensor in the greeting recognition operation.

3. The guide robot of claim 2, wherein the control unit further determines whether or not the at least one request is included in a recognized greeting when the greeting is recognized according to the greeting recognition operation, and selects the response voice based on the result of the determination.

4. The guide robot of claim 3, wherein the control unit outputs a guide voice according to the at least one request recognized, when it is determined that the at least one request is included in the recognized greeting, and
outputs the response voice matched to the recognized greeting when it is determined that the at least one request is not included in the recognized greeting.

5. The guide robot of claim 2, wherein the control unit performs a false recognition operation and greeting learning based on the received voice when a greeting is not recognized in the greeting recognition operation.

6. The guide robot of claim 1, wherein the response voice is any one of a greeting voice matched to the received voice and a guide voice for guiding utterance of the preset wake-up word.

7. The guide robot of claim 1, wherein the control unit initiates a greeting recognition operation and outputs the response voice matched to the received voice according to the greeting recognition operation, when the preset wake-up word is not included in the received voice, and
outputs a guide voice for guiding utterance of the preset wake-up word, in response to satisfaction of a predetermined condition after the response voice is output.

8. The guide robot of claim 7, wherein the predetermined condition includes at least one of when a volume of the received voice is increased, when a number of times of inputting a voice within a predetermined period of time is more than a predetermined number of times, or when a new voice is received within the predetermined period of time after the response voice is output.

9. The guide robot of claim 7, wherein the control unit outputs the response voice matched to a new voice when the new voice is received within a predetermined period of time without satisfying the predetermined condition after the response voice is output, and
terminates the greeting recognition operation when a predetermined period of time elapses without satisfying the predetermined condition after the response voice is output.

10. The guide robot of claim 1, further comprising a sensor configured to detect a user approaching to a main body of the guide robot,
wherein the control unit initiates a greeting recognition operation when the preset wake-up word is not included in the received voice, classifies user features by identifying the approaching user when the approaching user is detected by the sensor, and outputs the response voice by processing a greeting to be suitable for the classified user features.

11. The guide robot of claim 10, wherein the control unit acquires a facial image of the approaching user by activating a camera when the approaching user is detected by the sensor, and extracts and classifies the user features by analyzing the acquired facial image.

12. The guide robot of claim 1, wherein the control unit determines whether a predetermined keyword is included in the received voice when the preset wake-up word is not included in the received voice, and
transmits the voice including the keyword to a speech recognition server so as to receive situation information corresponding to the keyword, and outputs the response voice generated based on the received situation information, when it is determined that the predetermined keyword is included in the received voice.

13. The guide robot of claim 1, wherein the at least one request includes one or more query keywords that do not include the preset wake-up word.

14. A method for operating a guide robot capable of outputting a voice, the method comprising:
receiving a voice of a user;
determining whether the received voice includes a preset wake-up word;
based on the received voice including the preset wake-up word, transmitting the received voice to an artificial intelligence (AI) server that is set to be activated by the preset wake-up word, receiving result information from the artificial intelligence server, and outputting the received result information;
based on the received voice not including the preset wake-up word, determining whether or not at least one request is included in the received voice; and
outputting a response voice matched to the received voice based on a result of a determination of whether or not at least one request is included in the received voice.

15. The method of claim 14, wherein the outputting the response voice comprises:
performing a greeting recognition operation;
determining whether or not the received voice is recognized as a greeting based on a sensing signal received from at least one sensor, in the greeting recognition operation; and further determining whether or not a recognized greeting includes at least one request when the greeting is recognized according to the greeting recognition operation, and selecting a response voice based on the result of the determination.

16. The method of claim 15, further comprising:

outputting a guide voice according to the at least one request included, when the at least one request is included in the recognized greeting according to the result of the determination as to whether the at least one request is included; and outputting the response voice matched to the recognized greeting when the at least one request is not included in the recognized greeting according to the result of the determination as to whether the at least one request is included.

17. A guide robot, comprising:

a voice receiving unit configured to receive a voice;

a control unit configured to determine whether the received voice includes a preset wake-up word; and a wireless communication unit configured to perform communication with an artificial intelligence (AI) server set to be activated by the preset wake-up word, wherein the control unit transmits the received voice to the artificial intelligence server, receives result information from the artificial intelligence server, and outputs the received result information, when the received voice includes the preset wake-up word, and outputs a response voice selected according to a predetermined reference when the received voice does not include the preset wake-up word, wherein the control unit initiates a greeting recognition operation and outputs a response voice matched to the received voice according to the greeting recognition operation, when the preset wake-up word is not included in the received voice, and outputs a guide voice for guiding utterance of the preset wake-up word, in response to satisfaction of a predetermined condition after the response voice is output.

18. The guide robot of claim 17, wherein the predetermined condition includes at least one of when a volume of the received voice is increased, when a number of times of inputting a voice within a predetermined period of time is more than a predetermined number of times, or when a new voice is received within the predetermined period of time after the response voice is output.

19. The guide robot of claim 17, wherein the control unit outputs the response voice matched to a new voice when the new voice is received within a predetermined period of time without satisfying the predetermined condition after the response voice is output, and terminates the greeting recognition operation when a predetermined period of time elapses without satisfying the predetermined condition after the response voice is output.

* * * * *